United States Patent [19]

Arnold et al.

[11] Patent Number: 5,284,379
[45] Date of Patent: Feb. 8, 1994

[54] CONVERTIBLE AIRCRAFT PASSENGER SEATS

[75] Inventors: Peter J. Arnold; Lek H. Thixton, both of Seattle, Wash.

[73] Assignee: The Boeing Company, Seattle, Wash.

[21] Appl. No.: 754,944

[22] Filed: Sep. 4, 1991

[51] Int. Cl.⁵ .................................................. A47C 13/00
[52] U.S. Cl. .................................. 297/113; 297/257; 297/232
[58] Field of Search ................... 244/118.6; 297/232, 297/257, 118, 130, 113, 248, 249, 417, 402, 344

[56] References Cited

U.S. PATENT DOCUMENTS

| | | | |
|---|---|---|---|
| 954,594 | 4/1910 | Shaw. | |
| 1,096,518 | 5/1914 | Steinbeck | 297/344 X |
| 1,530,420 | 3/1925 | Schmitt. | |
| 2,242,617 | 5/1941 | Parry | 155/46 |
| 2,310,573 | 2/1943 | Burton | 297/118 X |
| 2,758,872 | 8/1956 | Solomon et al. | 296/65 |
| 2,858,877 | 11/1958 | Krause | 297/344 X |
| 3,051,274 | 8/1962 | Porter | 188/96 |
| 3,145,052 | 8/1964 | Morgan | 297/354 |
| 3,374,032 | 3/1968 | Del Giudice | 297/394 |
| 3,637,253 | 1/1972 | Maule et al. | 296/65 R |
| 3,743,351 | 7/1973 | Harris | 297/118 X |
| 3,877,747 | 4/1975 | Brennan et al. | 297/232 X |
| 3,893,729 | 7/1975 | Sherman et al. | 297/118 |
| 4,040,665 | 8/1977 | Wallace et al. | 297/417 |
| 4,159,148 | 6/1979 | Schulz | 297/417 |
| 4,341,415 | 7/1982 | Braun et al. | 297/257 X |
| 4,533,175 | 8/1985 | Brennan | 297/232 |
| 4,765,678 | 8/1988 | Huang | 297/236 |
| 4,768,832 | 9/1988 | Wain | 297/414 |
| 4,881,702 | 11/1989 | Slettebak | 244/118.6 |
| 4,917,438 | 4/1990 | Morgan | 297/411 |
| 5,037,157 | 8/1991 | Wain et al. | 297/194 |
| 5,104,065 | 4/1992 | Daharsh et al. | 297/232 X |
| 5,131,607 | 7/1992 | Arnold et al. | 297/232 X |
| 5,178,345 | 1/1993 | Peltola et al. | 297/232 X |

FOREIGN PATENT DOCUMENTS

| | | | |
|---|---|---|---|
| 3219710 | 12/1983 | Fed. Rep. of Germany | 297/257 |
| 0342855 | 1/1960 | Switzerland | 297/344 |

*Primary Examiner*—James R. Brittain
*Assistant Examiner*—Milton Nelson, Jr.
*Attorney, Agent, or Firm*—Bruce A. Kaser; Joan H. Pauly

[57] ABSTRACT

An improved convertible aircraft seating arrangement that is adapted to convert a row of seven economy class seats into a row of six business class seats, and vice versa. A pair of outboard seats (12, 20) are positioned on opposite sides of the passenger cabin (16), and a central set of seats (18) is positioned in between. In the economy class configuration, the central set consists of three seats (36, 38, 48), but is converted to two seats for the business class configuration. When making the conversion, the outboard pairs (12, 20) are slid inwardly a certain distance, and their inboard armrests (32) are extended further into the aisleway (22, 24) on each side of the central set (18). The outer, aisle seats (36, 38) against the centermost seat (48). There, they are joined to lateral sections of the centermost seat (78a, 78b), which are split apart from such seat to form wider, business class seats. The intermediate armrests (44, 46) of the central set (18) are nested within or behind the spilt-apart lateral sections (78a, 78c). The outer armrests (56, 58) of the central set (18) are also retracted inwardly to make up for the aisle space that was lost in the conversion of the outboard pairs of seats (12, 20).

12 Claims, 9 Drawing Sheets

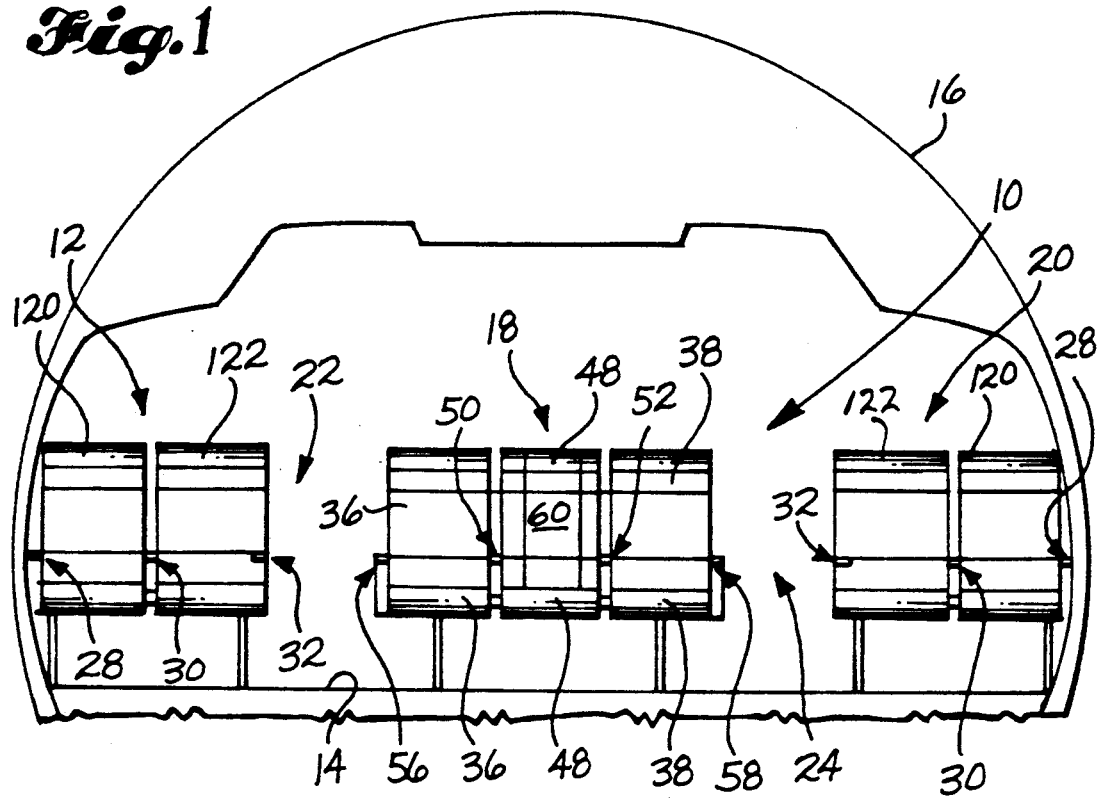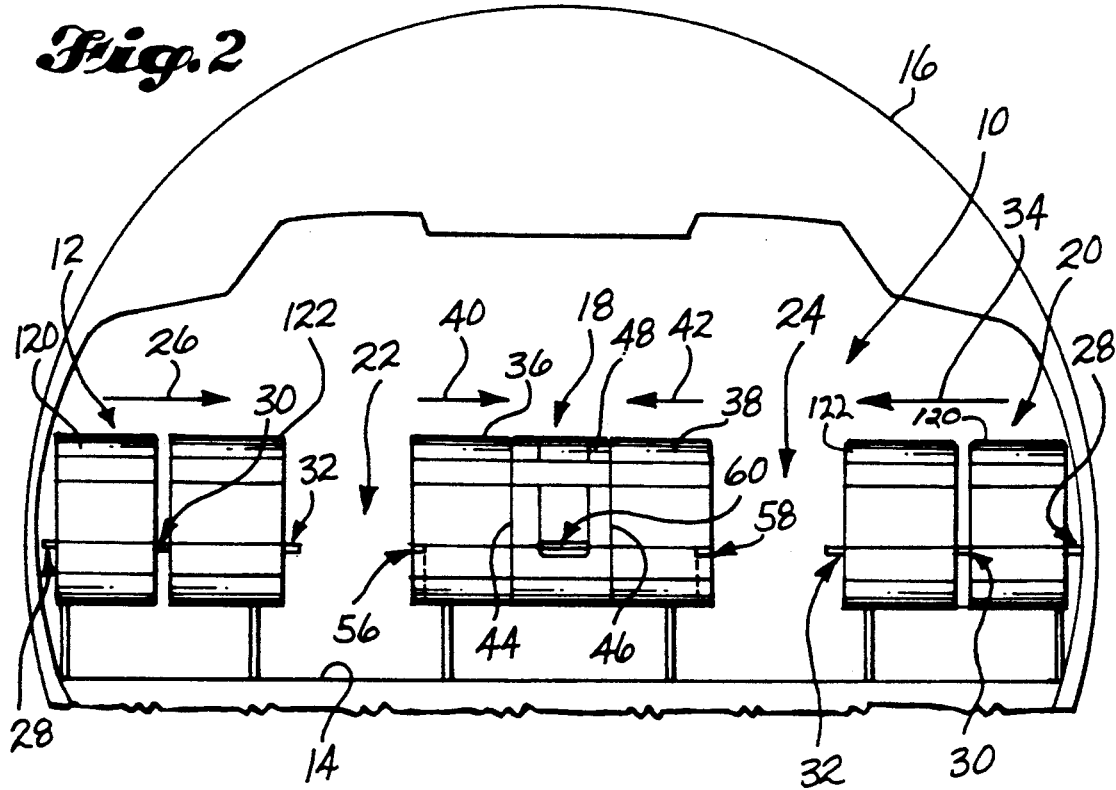

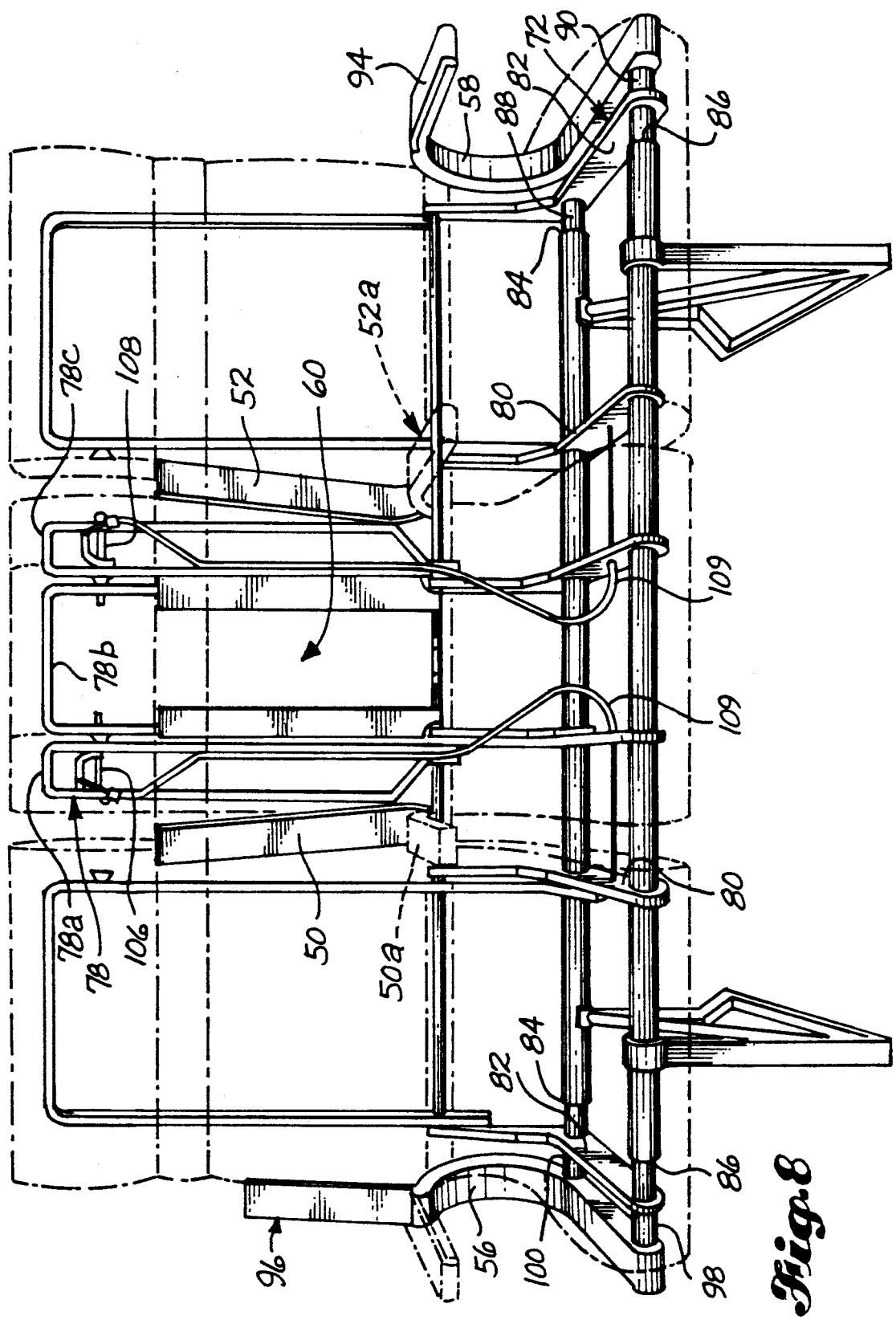

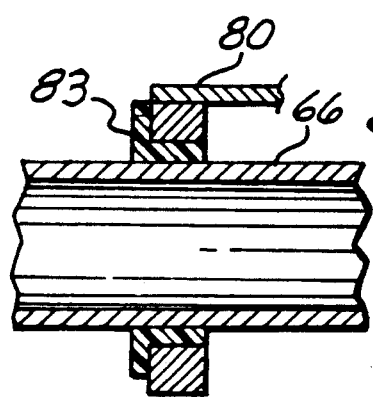
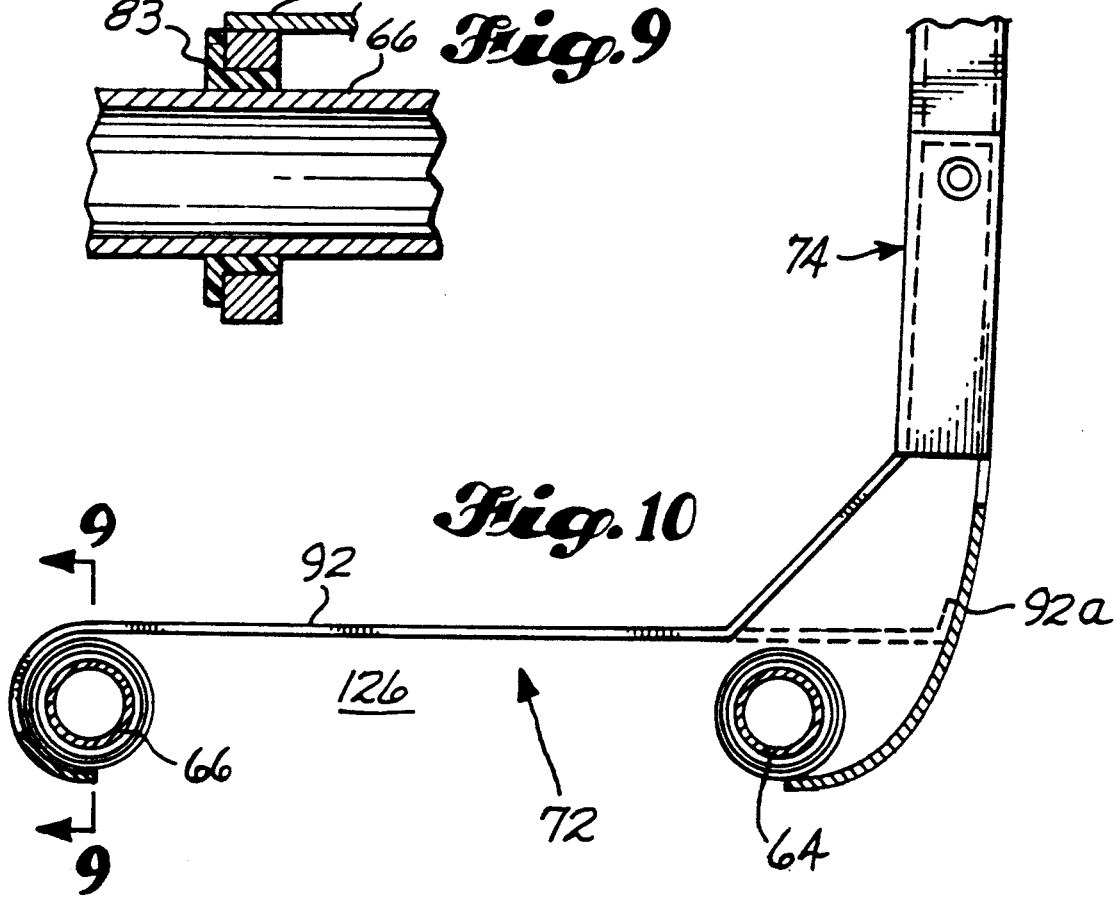

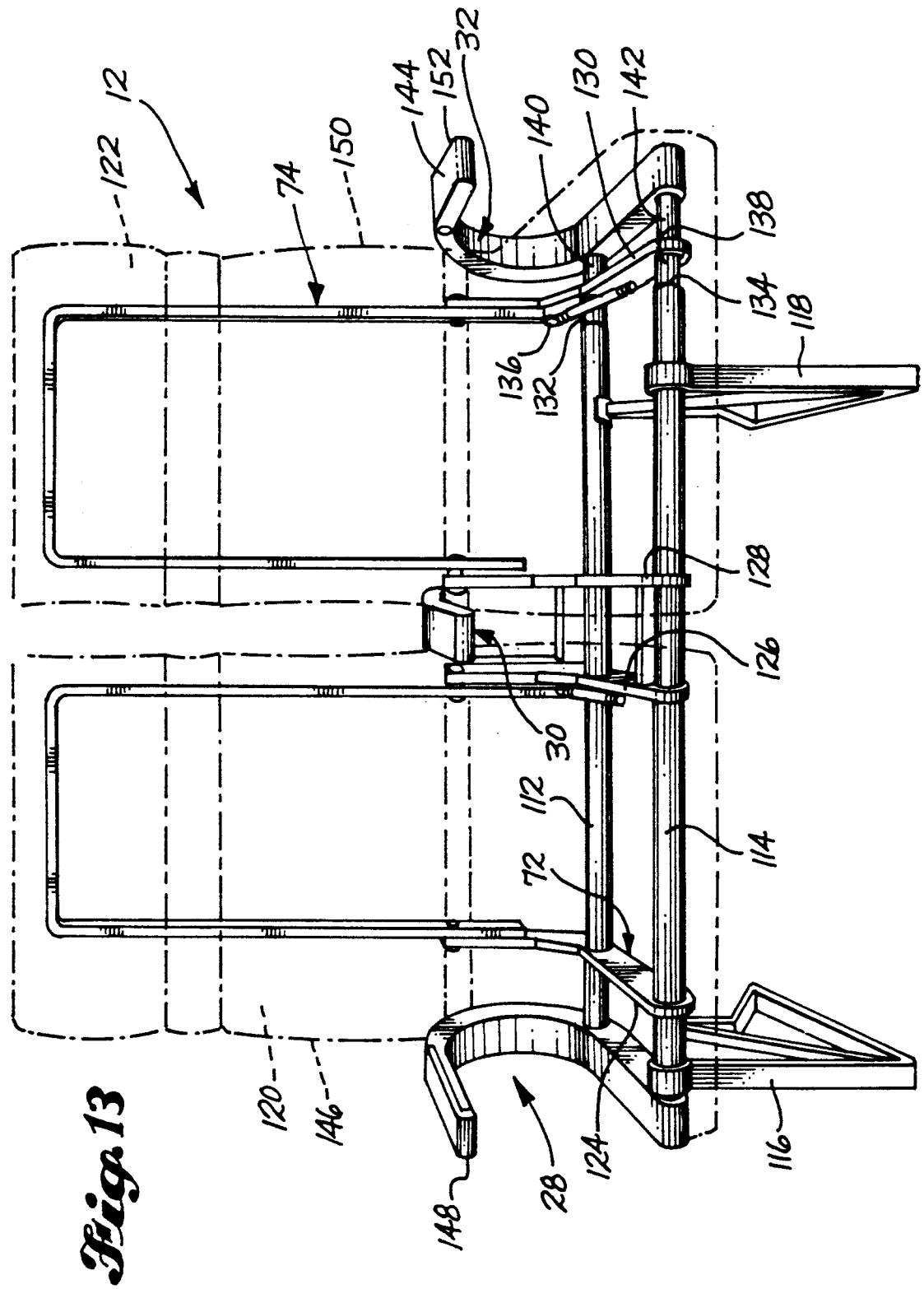

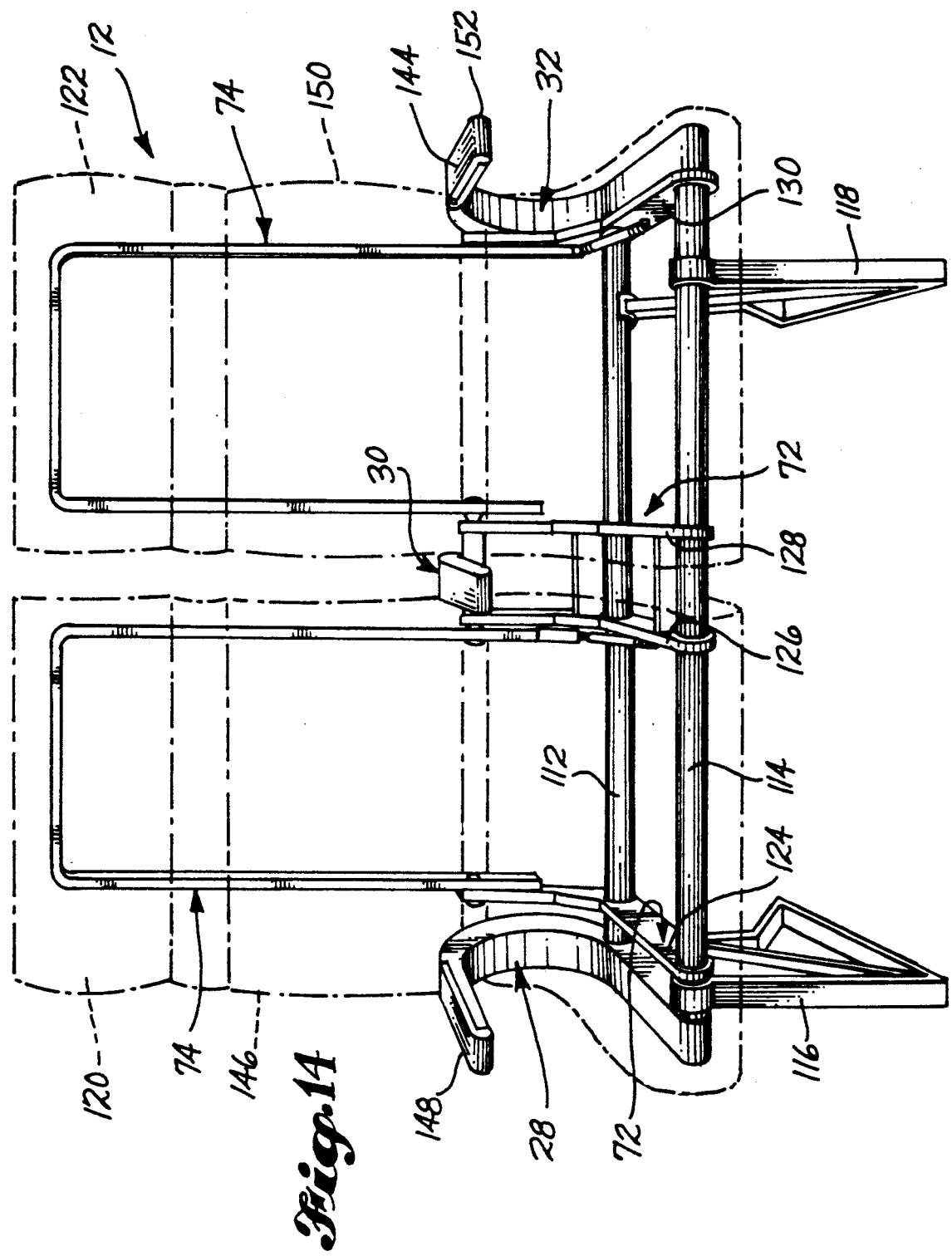

CONVERTIBLE AIRCRAFT PASSENGER SEATS

DESCRIPTION

1. Technical Field

This invention relates to aircraft passenger seats that are convertible in the number of seats that can be provided in any given row across the width of a passenger cabin. More particularly, the invention relates to passenger seats that are convertible from seven abreast to six abreast, and vice versa, for converting "economy" class seats to "business" class seats.

2. Background Art

It is well known that most or all commercial airlines have different seating classes. "First" class is the most expensive, but provides the passenger with expansive seating space, in addition to other amenities. The low fare seats are called "economy" or "tourist" class. These seats are the smallest in size, and take up the majority of seating space in the passenger cabin of the typical commercial jet.

In recent years, a new passenger class has been marketed by the airlines, which is commonly known as "business" class. The seats there are larger than economy class, and consequently are more expensive, but not as expensive nor as large as those in first class. The rationale underlying the creation of business class was that business travellers who fly frequently desire more space for working while in transit, in order to use travel time more efficiently, or for otherwise relaxing and sleeping, so that they arrive at their destinations more refreshed than they would otherwise be had they ridden in economy class. Although companies are hesitant to purchase first class seats for their employees who frequently travel on company business, because of the relatively high cost of such seats, the same companies are less hesitant to purchase business class seats at a lower cost.

Airline profitability has always been dependent on ridership levels. As such, airlines are masters of demographics and scheduling, and always strive to minimize the number of empty seats onboard their planes. Making seat reservations or seat scheduling that maximizes ridership is easier when there are only two seating classes, i.e. first or economy class, and especially when the vast majority of seats are in one class (e.g. economy). Adding a third, business class, makes it more difficult to minimize the number of vacant seats, because of the difficulty in predicting the number of crossover passengers that will upgrade or downgrade to or from business class. Special low-rate fares, which airlines are known to provide on a frequent basis, redemption of frequent flyer coupons, and other factors all cause ridership levels in business class to fluctuate over a period of time.

When airlines order new jets, they designate the number of seats in each class. After the plane is placed into service for a given route, it may later be determined that a greater or lesser number of business class seats is required. Although it is relatively easy, from a purely mechanical standpoint, to remove seats of one class and replace them with another, the replacement generally takes the plane out of service for a certain period of time. That is to say, the plane must be taken to a service facility having the capability of making the seating change. Once there, it takes workmen a certain period of time to remove one class of seats and replace them with another before the plane can be placed back into service.

Aircraft down-time is undesirable, whether it be for seat replacement or other maintenance reasons. If, for example, it takes one day to remove business class seats and replace them with economy class seats, or vice versa, that one day represents lost airline income. For this reason, the airlines have expressed a desire to have a certain number of seats that are readily convertible from one type to another without requiring seat removal, or any other kind of complicated procedures. The best solution is a design that permits conversion by the ground crew at any airport, or even flight attendants, if need be.

A search of the patent literature discloses a number of prior attempts at meeting this need. For example, U.S. Pat. No. 4,881,702, issued to Slettebak, illustrates a convertible aircraft seating system where a row of seven economy seats (two aisle seats on opposite sides of the passenger cabin, and a set of three seats in the middle) are converted into six business class seats.

The convertible seating arrangement of Slettebak is similar to the invention disclosed here in that the present invention is also a seven-to-six abreast convertible seating system. However, the present invention differs substantially from Slettebak in that it provides convertibility from one class to another, without varying the aisle width between seats, in addition to providing other kinds of advantages.

Other kinds of convertible aircraft seats are disclosed in U.S. Pat. Nos. 4,533,175 and 3,145,052, issued to Brennan and Morgan, respectively. Both patents disclose aircraft seats that are convertible from three seats across to two seats across.

The invention described and disclosed here represents an improvement over past convertible seating designs. The manner and mode of implementing such improvement will become apparent upon consideration of the following description.

RELATED APPLICATIONS

The subject matter of the seating arrangement disclosed here is related to the subject matter of the following applications; (1); a continuation-in-part of U.S. Ser. No. 07/482,197, now U.S. Pat. No. 5,104,065 entitled "Readily Convertible Aircraft Passenger Seats," filed Feb. 20, 1990, by Donald R. Daharsh et al., the continuation-in-part application being entitled "Aircraft Seat Assembly," and (2) a second continuation-in-part application of the same parent application which is also entitled "Aircraft Seat Assembly," both filed on even date herewith.

The above applications are commonly owned by The Boeing Company of Seattle, Wash., who is also the assignee of the seating arrangement disclosed here.

SUMMARY OF THE INVENTION

The invention is an improved, convertible seating arrangement, for changing a row of seven economy class seats into a row of six business class seats. A seating arrangement in accordance with the invention comprises two pairs or sets of outboard seats, positioned in opposite side regions of the aircraft cabin and a central set of seats in the middle of the cabin. The central set is separated from the outboard seats by aisles on each side. When in the seven-seat configuration, the central set is configured as three side-by-side seats, each spaced slightly apart from the other. When in the business class configuration, the central set is reconfigured from three to two seats.

To convert from seven abreast to six abreast, the outer or aisle seats of the central set are slid inboardly until they abut adjacent the centermost seat. The outer armrests of each aisle seat are normally extendible and retractable relative to the aisle on each side, depending on which way the central set is configured. When changing from three to two seats, the aisle armrests are retracted to create additional aisle space.

To refill the added aisleway space, each pair of outboard seats is slid inwardly or inboardly a certain distance while the outboardmost armrest of such seats remains stationary. The inboardmost armrest is extendible a certain distance beyond the movement of the seats. This creates a wider seating width between the armrests of the pair, and causes both the seats and the inboardmost armrest to extend inwardly into the aisle on one or the other side of the central set of seats.

When the central set is in the three-seat configuration, it has two intermediate armrests positioned adjacent opposite lateral sides of the center seat. Prior to conversion from three to two seats, these armrests are pivoted upwardly, and are nested within seat cushion recesses in the seat back portion of the center seat. Conversion back from six to seven abreast involves reversing the above procedure.

In accordance with the particulars of the invention, each outboard pair of seats includes a main frame that is mounted to the floor of the aircraft cabin. Fixedly connected to one end of such frame is a first or outboard armrest assembly. As mentioned above, such armrest assembly never moves during the above-described conversion process.

The seats themselves consist of a pair of side-by-side seat frames, both of which are slidably or movably mounted to the main frame. Such frames are covered by conventional seat cushions. During the seven-to-six conversion process, they move together, as a pair or single unit, toward the aisle.

A second or inboard armrest assembly is telescopically mounted adjacent the inboard end of the main frame, and is further extended relative to the pair of seat frames when such conversion is made. It thereby further moves toward the laterally-shifted aircraft aisle at least several inches more than when the seats were configured for seven across.

A center armrest is positioned intermediately of the seat frames, and moves along with them toward the aisle. Thus, its relative position changes only with respect to the main frame and the outboard and inboard armrests. The net result is that the spacing across the seat frames, and more specifically, between the armrests, expands and thereby provides a wider seating area in accordance with the requirements of business class seating. The width of each aisle remains constant, although its boundaries are laterally shifted.

The central set of seats includes a central seat frame, and a pair of aisle seat frames, one adjacent each lateral side of the central seat frame. These three-seat frames are mounted to the floor of the aircraft cabin by means of a central main frame that is similar in construction to the main frame, described above, which serves to mount the outboard seats. Like the outboard seats, the seat frames of the central set are covered by seat cushions. All of the seat frames, including the seat frames making up the outboard pair of seats described above, have both a seat base portion and a seat back portion.

The aisle seat frames of the central set are slidably movable, laterally, either inboardly or outboardly relative to the center seat frame, depending on which way the seat conversion is being made. When in the seven-seat mode, the aisle seat frames are spaced well apart from the center frame. The central set is converted into two seats by sliding the aisle frames inwardly until they are in close relationship to the center frame, such that the seat cushions that cover such frames abut each other.

The seat back portion of each aisle seat frame carries an intermediate armrest that pivots between a horizontal position and an upright position. In other words, the central set has two intermediate armrests, one on each side of the center frame. When converting the center set from three to two seats, these intermediate armrests are pivoted upwardly, and are fitted behind a portion of the seat back of the center frame.

The seat back of the center seat frame is splittable into three vertical sections. One of such sections is centrally located, and the two others, one on each side of the central section, are joined to the aisle frames on each side, and become part of the two business class seats.

Each intermediate armrest is fitted behind one of the lateral vertical sections. After such section is connected to the aisle seat on its respective side, it becomes tiltable with the seat back of the aisle seat, and thereby provides a wider seat back.

The central set of seats further has outer armrest assemblies on opposite sides. These assemblies are telescopically mounted to the aisle-side of each aisle seat frame. When in the economy class configuration, the armrests are normally extended relative to the aisle seat frames. When in the business configuration, they are retracted, independently of the movement of the aisle seat frames, toward the center seat frame. The combination of the inboard movement of the aisle seats, with such retraction, creates additional aisleway space that is filled up by the conversion of the outboard pair of seats.

The intermediate armrests, which are nested and hidden from view, are replaced by a single central armrest that unfolds or pivots from the centermost, vertically splittable section of the central seat frame. Although, in accordance with the above description, when making the conversion from economy to business class, the outer armrests of the central seat are retracted inboardly, thus bringing them closer together and narrowing the overall width of the central set, such narrowing is compensated for by elimination of the central seat.

The invention as summarized above is embodied in the claims appended hereto. Although the above summary is directed to making an economy to business class conversion (seven to six abreast), it is to be appreciated that the conversion can be made either way. Reconfiguring from business to economy class involves merely reversing the above procedures.

The above summary, and the scope of the appended claims, will become better understood after review of the following detailed description of the invention, which is to be read in conjunction with the attached drawings, such drawings being briefly described below.

BRIEF DESCRIPTION OF THE DRAWINGS

In the drawings, like reference numerals and letters normally refer to like parts throughout the various views, unless indicated otherwise, and wherein:

FIG. 1 is a schematic cross-section of a typical passenger cabin in the fuselage of a commercial jet aircraft, and shows a row of seven convertible seats in accordance with the invention;

FIG. 2 is a view like FIG. 1, but shows the seats converted to six business class seats across the cabin;

FIG. 8 is a view like FIG. 7, but shows the frame structure configured for economy class seating;

FIG. 9 is an enlarged, fragmentary cross-sectional view of a slider bearing for moving certain portions of the seat frame structure shown in FIGS. 7 and 8 along the tubes of a main seating frame, and is taken along line 9—9 in FIG. 10;

FIG. 10 is a cross-sectional view of the lower part of the seat frame structure shown in FIGS. 7 and 8;

FIG. 13 is a view similar to FIGS. 7 and 8, but shows the seat frame structure for the outboard pairs of seats shown in FIGS. 1 and 2, and further shows such seats configured for business class seating; and FIG. 14 is a view like FIG. 13, but shows the outboard seat frames configured for economy class seating.

BEST MODE FOR CARRYING OUT THE INVENTION

Figure 3:
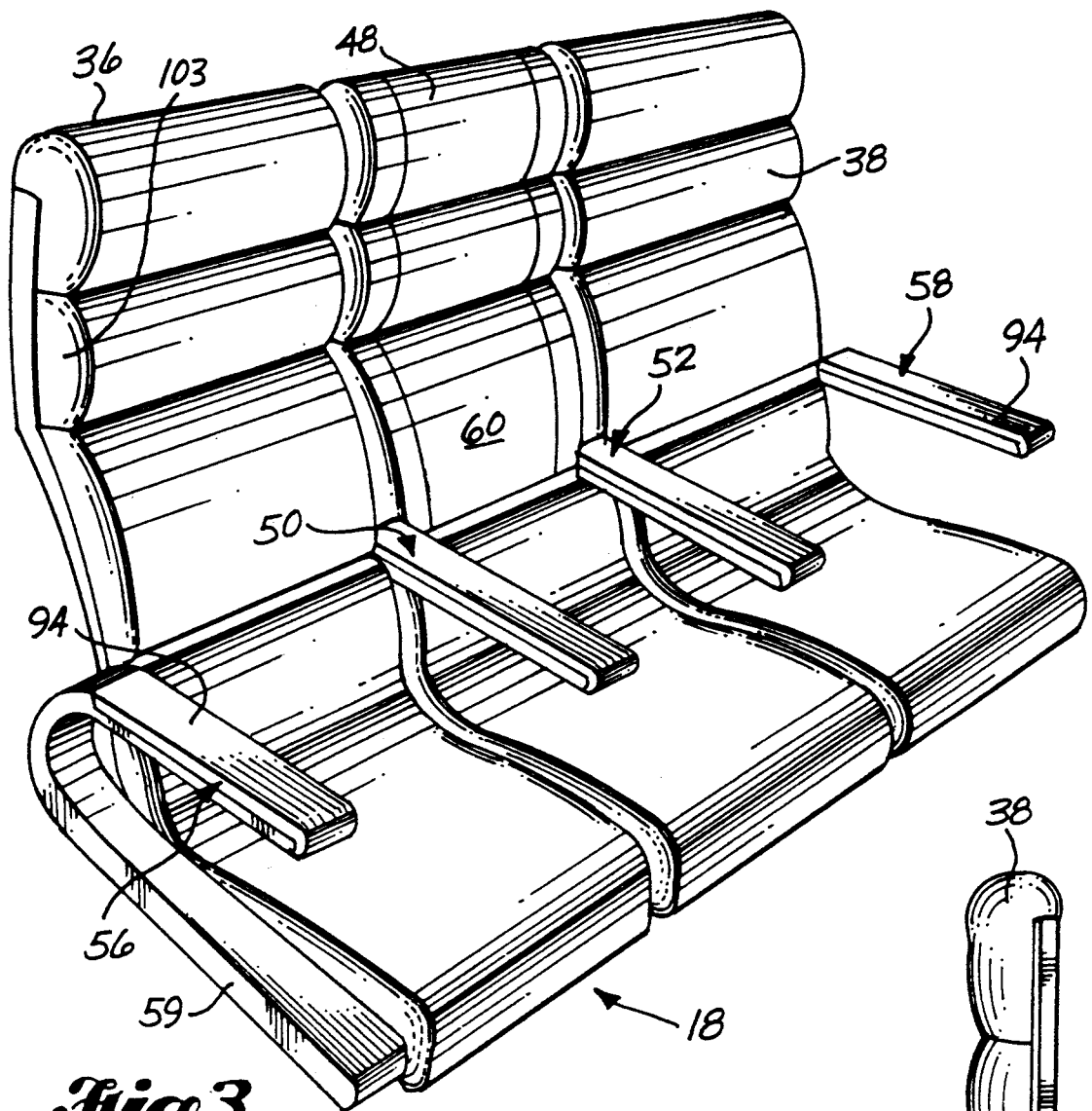
FIG. 3 is a pictorial view of the centermost set of seats shown in FIGS. 1 and 2.
Figure 4:
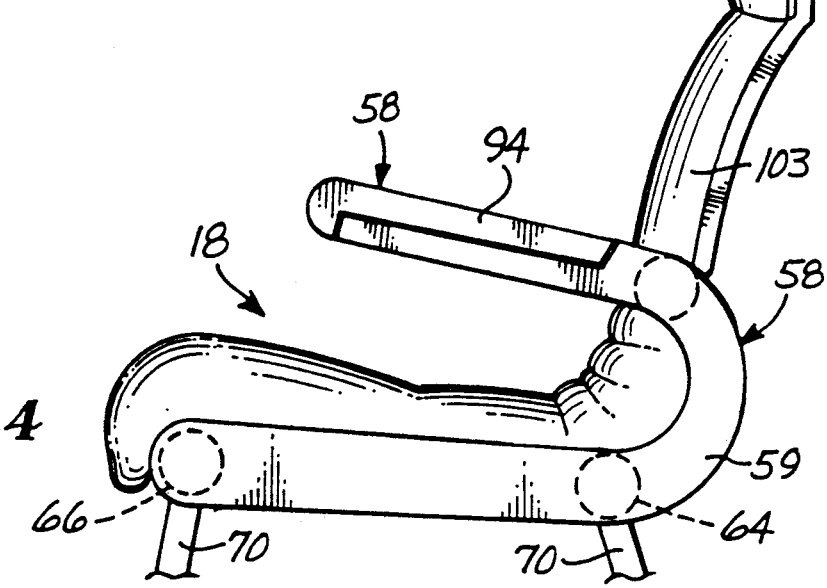
FIG. 4 is a side elevational view of the seats shown in FIG. 3.

Referring now to the drawings, and first to FIG. 1, shown generally at 10 is a convertible seating arrangement in accordance with a preferred embodiment of the invention. As mentioned above, the seating arrangement 10 is designed to be convertible from seven abreast to six abreast, and vice versa. Seven abreast corresponds to economy class seating while six abreast corresponds to business class seating.

The seating arrangement 10 consists of a first pair of outboard seats 12 that is mounted to the floor 14 of the passenger cabin in an aircraft fuselage 16. It further includes a central set of seats 18, and another or second pair of outboard seats 20 positioned in the opposite side of the cabin.

The seats shown in FIG. 1 are configured for seven economy class seats. For such seating class, the seating width across each seat, i.e. from armrest to armrest, is approximately eighteen inches. The aisle width on opposite lateral sides of the central seats 18, which is generally indicated at 22, 24, respectively, in FIGS. 1 and 2, is approximately nineteen and one-half inches.

FIG. 2 shows the seats reconfigured for business class. There, the outboard seats 12, on the left-hand side of the cabin, have been simultaneously moved together in the inboard direction, or in other words, in the direction indicated by arrow 26. In accordance with the invention, the outboardmost armrest 28 of such seats remains stationary, and the intermediate armrest 30 moves inboardly with the seats. The inboardmost armrest 32 is telescopically extended, in a manner to be described later, inwardly to redefine aisle 22.

In FIG. 2, the other pair of outboard seats 20, or more specifically, the pair shown in the right-hand portion of the cabin, are reconfigured inwardly in an identical manner, but in the direction indicated by arrow 34. The central set of seats 18 is reconfigured from three to two seats.

To reconfigure the central set 18, the aisle seats 36, 38 thereof are slid inwardly, in the directions indicated by arrows 40, 42, respectively, until they abut against the opposite lateral sides 44, 46 of the centermost seat 48. Referring again to FIG. 1, it can be seen that when the central set 18 is in the three-seat configuration, the aisle seats 36, 38 are spaced apart from the center seat 48.

Figure 5:
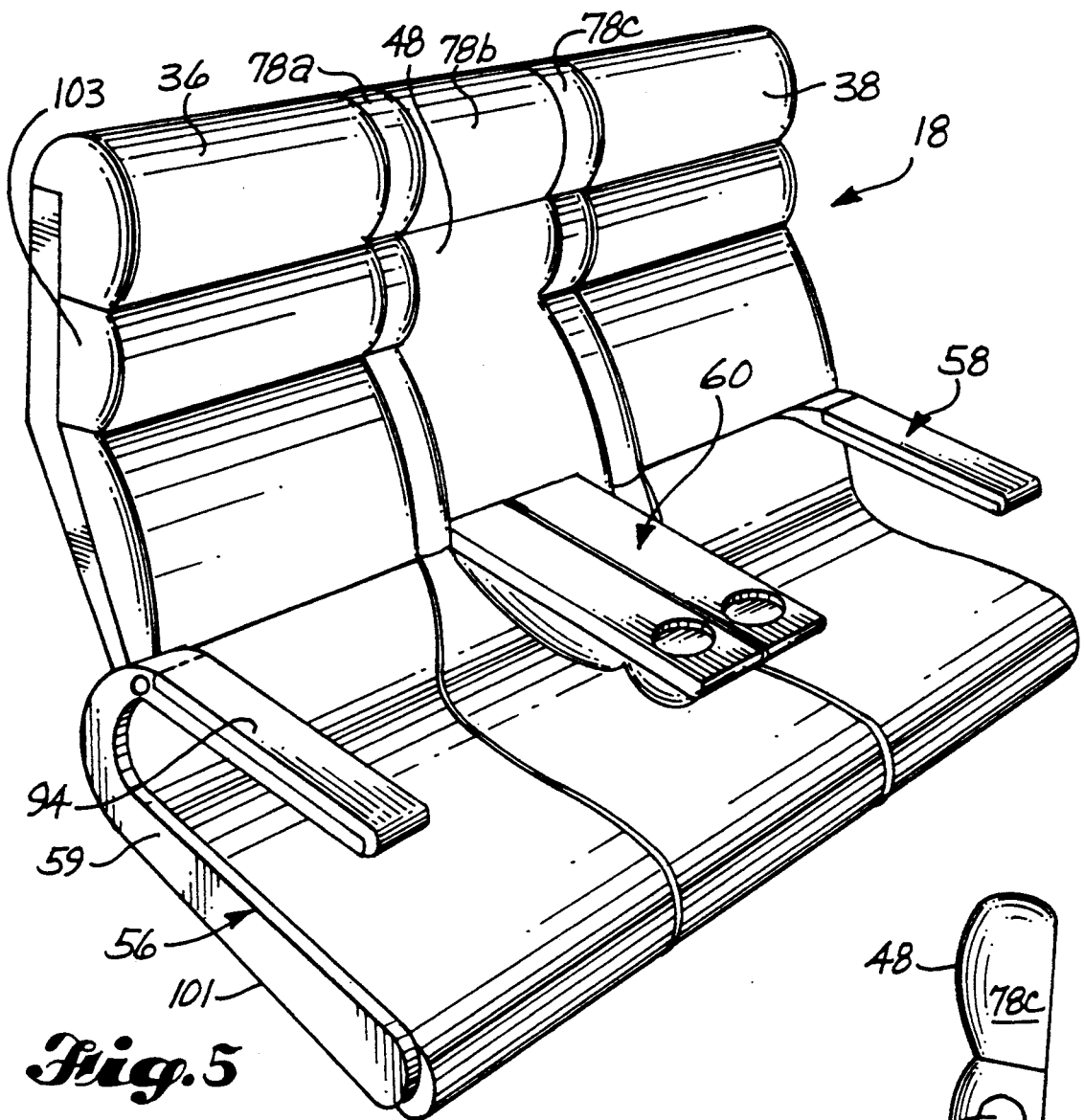
FIG. 5 is a view like FIG. 3, but shows the centermost seats converted into two business class seats.
Figure 6:
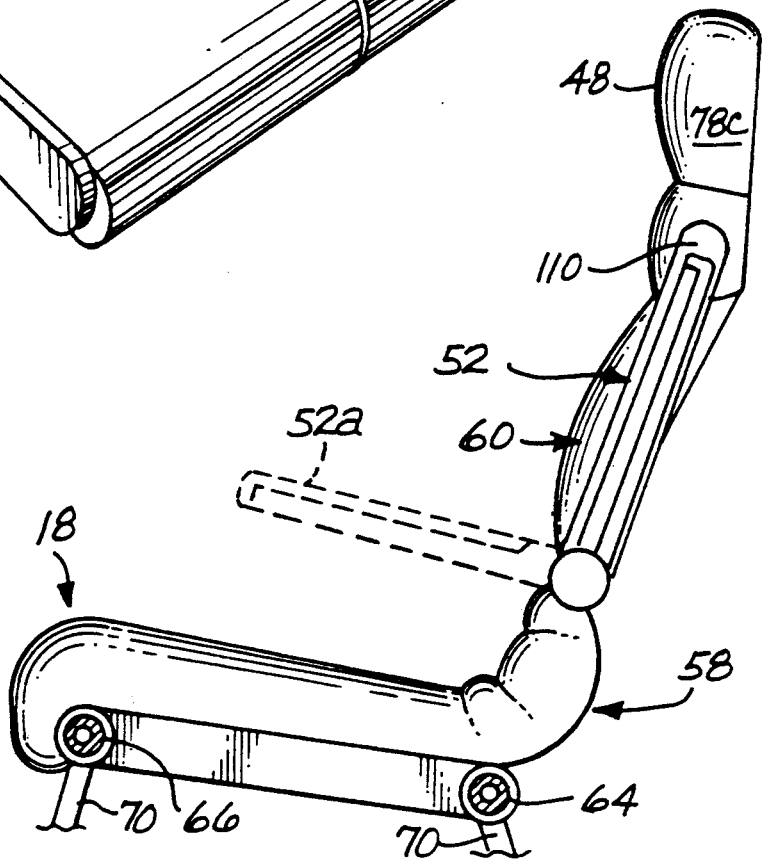
FIG. 6 is a side elevational view of the right-hand side of the centermost seat of the three seats shown in FIGS. 3 and 5.

When making the conversion shown in FIG. 2, the intermediate armrests 50, 52 of the central set 18 (see FIG. 3) are pivoted or folded in the manner shown by dashed lines 54 in FIG. 6. They nest or are stowed behind the seat back frame of the center seat 48, in a manner that is further described below. The outer armrest assemblies 56, 58 of the central set 18 are also retracted inwardly relative to the aisle seats 36, 38. A center armrest 60 (see FIG. 5) is unfolded from the front of the center seat 48. Thus, the center seat 48 is eliminated, and the distance between outer armrests 56, 58 and center armrest 60 corresponds to the width of business class seating (approximately twenty inches from armrest to armrest). Further, by retracting armrests 56, 58 inboardly, the width of aisles 22, 24, resulting from the reconfiguration of the outboard seats 12, 20, is maintained. This results in the width of aisles 22, 24 remaining at substantially nineteen and one-half inches, although each aisle is shifted a few inches inwardly.

Figure 7:
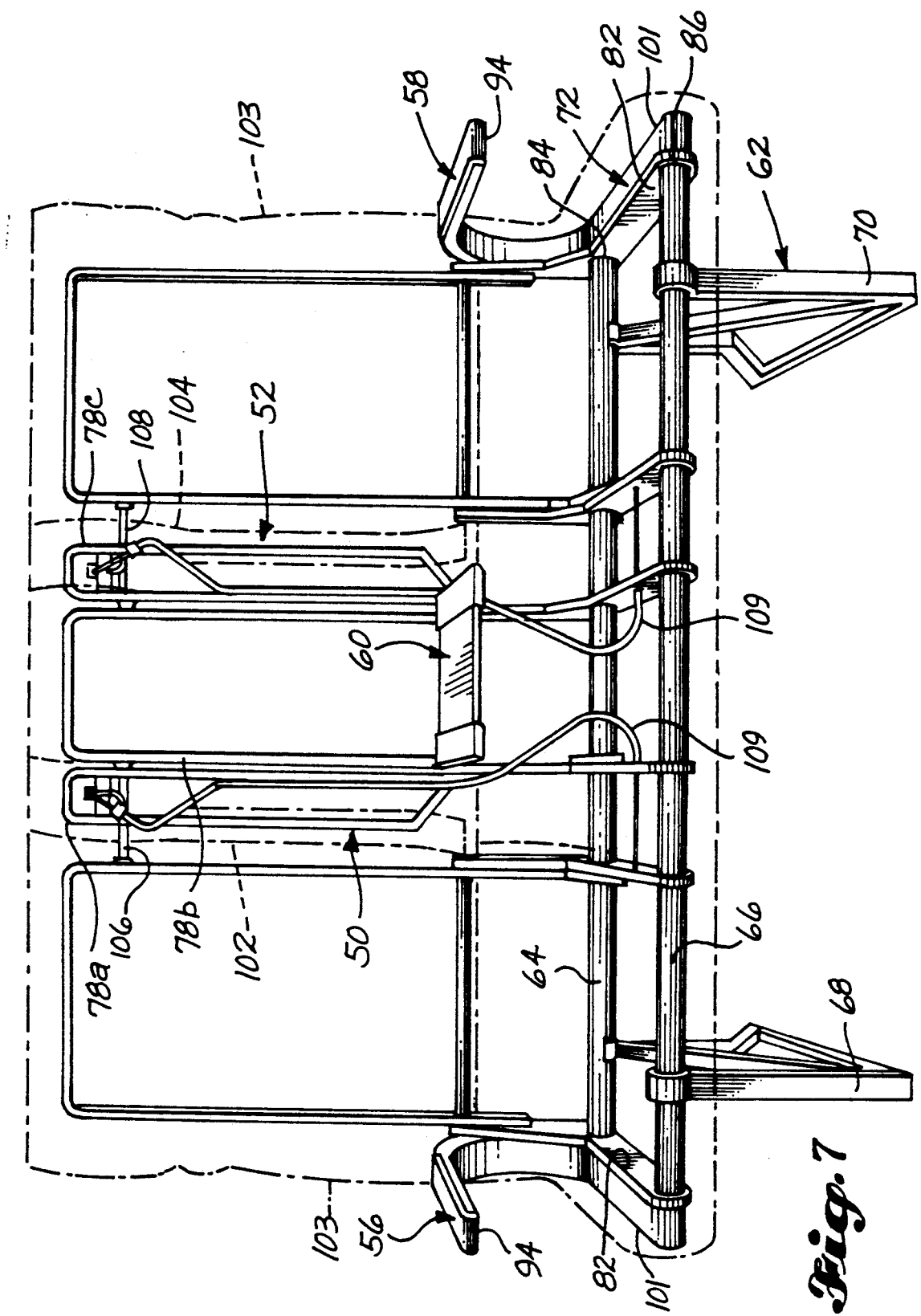
FIG. 7 is a frontal view of the seat frame structure of the seats shown in FIGS. 3–6, and shows the frame structure configured for business class seating.

FIGS. 3–6 are views of the central set of seats 18, and show such set in both the three and two-seat configuration. FIGS. 7 and 8 are views of the seat frame structure for such seats. The central seats 18 are supported by a main seating frame, which is generally indicated at 62. Such frame 62 includes a pair of tubular frame members 64, 66 supported by seat legs 68, 70. The legs 68, 70 are mounted or otherwise fixedly attached directly to the floor 14 of the aircraft passenger cabin.

Each seat, i.e. the central seat 48 and aisle seats 36, 38, have their own separate frames or frame structures that are covered by seat cushions. All of the seat frames are identical in the sense that each has a seat base portion, indicated at 72 (see FIGS. 11 and 12), and a seat back portion, indicated at 74. In the case of the center seat 48, however its seat back portion, which is indicated at 78 in FIG. 8, is vertically splittable into three sections 78a, 78b, 78c. As can be seen from FIGS. 13 and 14, the seat frames making up the pairs of outboard seats 12, 20 are nearly identical in construction, except as is otherwise described below.

Referring to FIG. 8, the seat base portion 72 of the aisle seats 36, 38 each include seat frame members 80, 82 which traverse the space between tubular frame members 64, 66. The outboardmost seat frame member 82 is telescopically connected to the outer ends 84, 86 of the tubular frame members 64, 66. That is to say, each outboard seat frame member 82 of the central set 18 has tubular extensions 88, 90 that fit into hollow end openings 84, 86 of tubular frame members 64, 66. This arrangement enables the seat frame members 82 to be retracted or extended relative to the main seat frame 62, for converting the central set 18 from three to two seats, and vice versa.

When such movements are made, the other or inboard seat base frame members 80 slide over the tubular frame members 64, 66. This arrangement is better shown in FIG. 9. Directing attention there, seat frame member 80 has a circular opening in which is received a conventional slider bearing 83. By way of nonlimiting example, such bearing may be a type of nylon material, or something equivalent, so long as it permits easy, sliding movement between the seat frame member 80 and the tubular frame member 66.

Referring again to FIG. 12, each seat base portion 72 is strengthened by a seat pan 92. Such pan may also extend below the base 72, traversing the span between frame members 80, 82, and may also extend partially upwardly in the rear, as shown at 92a in FIGS. 11 and 12. It is preferable to have the seat pan placed across the top of seat frame members 80, 82. This is shown partially or fully removed in the drawings, however, as it is not particularly germane to the understanding or practice of what is considered to be the invention here.

The outer armrest assemblies 56, 58 are telescopically connected to the outboard seat frame members 82 of the aisle seat frames. For example, both armrests 56, 58 are preferably in the form of a "C" shaped frame 59 (see FIG. 5) having an upper armrest portion 94 that normally extends horizontally forwardly of the seats 36, 38, 48. Such armrest 94 is a pivotable part of the C frame 59, and may be lifted upwardly in the manner shown at 96 in FIG. 8, in order to facilitate ingress and/or egress to or from the seats. Such arrangement is particularly well-suited for handicapped people.

Connected to the base of the C frame 59 are tubular extensions 98, 100. These extend through circular openings in seat frame members 82, and are telescopically received within tubular extensions 88, 90. Thus, extensions 98, 100 and 88, 90 are concentrically arranged, and provide a two-step telescoping action relative to the ends of tubular frames 64, 66.

When the central set of seats 18 is in the three-seat configuration shown in FIG. 8, the outer armrest assemblies 56, 58 and the aisle seats 36, 38 are in the extended position as shown. The aisle seat frame members 80 each carry intermediate armrests 50, 52. These armrests are pivotable between a generally horizontal position, as shown by dashed lines 50a, 52a, and a generally upright position, as shown in FIGS. 6 and 8.

When in the three-seat configuration, the intermediate armrests 50, 52 are down, and define the seating width of center seat 48. When the central set 18 is converted from three-to-two, the intermediate armrests 50, 52 are pivoted upwardly into the spaces between aisle seats 36, 38 and center seat 48, as shown in FIG. 8. Then, the aisle seats are pushed or slid inboardly, causing the outboard seat frame member 82 of each aisle seat to abut against the outermost ends of tubular frame members 64, 66, as shown in FIG. 7. Of course, the seat base and seat back portions 72, 74 of each aisle seat 36, 38 move or slide accordingly. As they slide, the armrests are stowed or nested in recesses 110 in opposite lateral sides of the center seat 48 (see FIG. 6). This arrangement is further described below.

The outer armrest assemblies 56, 58 are also telescopically retracted inwardly as shown in FIG. 7, and in such position, their outer edges 101 will be substantially coplanar or flush with the outboard side 103 (see FIG. 5) of the seat cushions of aisle seats 36, 38.

Such movement brings the inboard edges of the aisle seat cushions into direct contact with the lateral edges of the center seat cushions, as shown by dashed lines 102, 104 in FIG. 7. As mentioned above, the seat back of the center seat 48 is splittable into three vertical sections 78a, 78b, 78c. When the central set of seats 18 is in the three-seat configuration, these three vertical sections 78a, 78b, 78c are joined together by pins 106, 108, which engage the framework of the central section 78b with the framework of the lateral section 78a, 78c. Thus, all three sections 78a, 78b, 78c function as a single seat back, and tilt together when the central set 18 is in the three-seat mode. This arrangement is best seen in FIG. 8.

When the aisle seats 36, 38 are moved inboardly, the pins 106, 108 are then shifted via a push/pull cable 109 so that they engage lateral sections 78a, 78c with the aisle seats 36, 38 on each side, and simultaneously disengage with the center section 78b. Lateral section 78a is then configured to tilt with the seat back portion 74 of aisle seat 36, and similarly, section 78c is configured to tilt with the other aisle seat 38.

The seat base portion 72 of the center seat 48 remains fixed in position at all times, regardless of whether the central set 18 is in the three or two-seat configuration. When in the two-seat configuration, the center armrest 60 is downwardly pivotable as shown in FIGS. 7 and 5. As is apparent from FIG. 5, such armrest normally makes up a portion of the seat back cushion of central section 78b when the center set 18 is in the three-seat configuration.

The intermediate armrests 50, 52, which are pivoted upwardly before the aisle seats 36, 38 are moved inwardly, each nest behind the framework of vertical sections 78a, 78c in lateral recess 110. Of course, such frame sections are covered by seat cushions, as shown in FIGS. 3–6, and the recess 110 (see FIG. 6) is provided in the cushion covering each lateral section 78a, 78c.

FIGS. 13 and 14 show the framework for the outboard pair of seats 12 shown in the left-hand portion of the passenger cabin in FIG. 1. The other pair of outboard seats 20 is constructed identically, although its sliding parts are reversed.

Like the central set of seats 18, the outboard set 12 includes two seat frames, each having a seat base portion 72, and a seat back portion 74. These frames are slidably mounted to a pair of tubular main frame members 112, 114, which are similar to the tubular frame members 64, 66 of the central set 18 (see FIGS. 7 and 8). Both tubular frame members 112, 114 are mounted to the floor 14 of the aircraft cabin by legs 116, 118.

Figure 11:
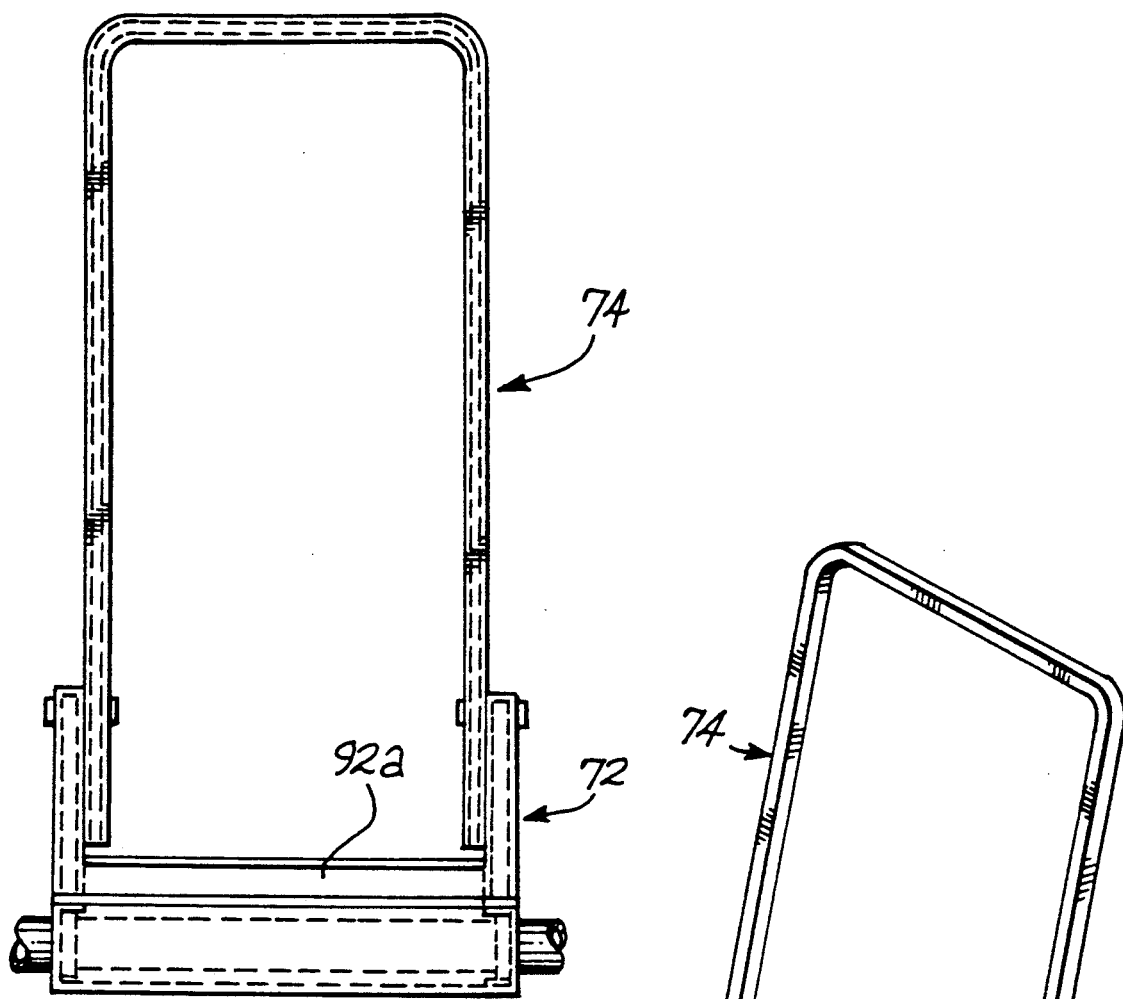
FIG. 11 is a rear view of a seat frame in accordance with the invention.
Figure 12:
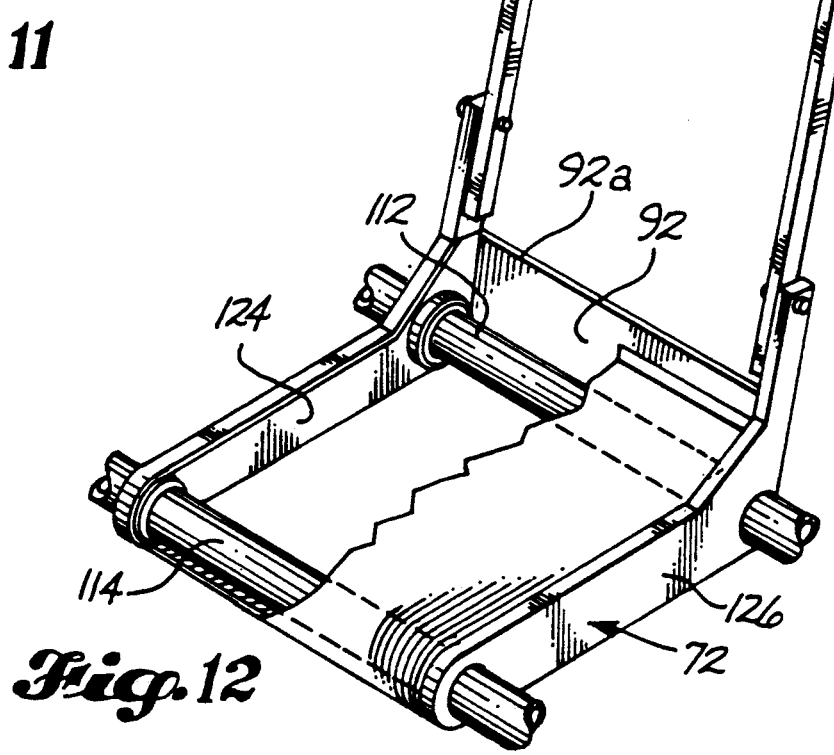
FIG. 12 is a pictorial view of the seat frame shown in FIG. 11.

The left-hand seat 120 of pair 12 is spaced apart from the right-hand seat 122. Reference numerals 124, 126 indicate the seat frame members of the seat base portion 72 of the lefthand seat 120. These frame members 124, 126 are constructed the same way as the inboard seat frame member 80 of the aisle seats 36 38, i.e. the seats making up the central set of seats 18, as previously described. Referring to FIGS. 11 and 12, for example, both seat frames 124, 126 slide over tubular frames 112, 114, when the outboard pair 18 is reconfigured.

The seat frame members 128, 130 of the right-hand seat are configured identically to the aisle seats 36, 38 of the central set 18. That is, the right-hand seat frame member 130 is telescopically connected to the inboard ends 132, 134 of tubular members 112, 114. Such member 130 has extensions 136, 138 that are slidably received in the hollow ends of members 112, 114. Seat frame members 126, 128 are linked together such that left-hand seat 120 and right-hand seat 122 slide together as a unit.

The outboard armrest assembly 28 is fixedly connected to the ends of tubular frame members 112, 114. Like the armrest assemblies 56, 58 previously described, it generally has a "C" shaped configuration. The inboard armrest assembly 32 is similar in construction and operation to the armrest assembly 58 previously described for the central set of seats 18. It telescopically extends or retracts relative to seat frame member 130 via extensions 140, 142 which slide in and out of extensions 136, 138. It also has a horizontal armrest portion 144 that may be pivoted upwardly or downwardly.

When the outboard pair of seats 12 of FIGS. 13 and 14 are arranged for the seven-abreast seating configuration (see FIG. 1), the seats 120, 122 are positioned all the way to the left, so that the outer edge 146 of the left-hand seat 120 is substantially flush with the outer edge 148 of outboard armrest assembly 28. In such position, the seat frame member 130 of the right-hand seat 122 is retracted relative to tube ends 132, 134, and the inboard armrest assembly 32 is also retracted, as shown in FIG. 14. In such configuration, the outer edge 150 of the right-hand seat 122 is substantially flush with the outer edge 152 of the armrest assembly 32.

In sum, the convertible seating arrangement 10 involves the use of certain unique structural features, as well as a method of employing or utilizing such features in a manner that is believed to provide certain advantages over and above other convertible aircraft seats that are known in the prior art. The seating arrangement 10, as disclosed here, has two primary attributes. First, it is easy to convert from one seating class to another in that it does not involve mechanically removing seats or portions of individual seats, nor does it involve removing and/or exchanging armrests. Seat conversion can be accomplished easily without any tools. Second, the width of the aisles 22, 24 remains constant regardless of seating class. This is a direct result of the combination of the way the various parts of the above-described seats are shifted relative to their respective armrests.

Having the above description, it should be apparent as to how the seats described herein are convertible between business and economy class. The preceding description should be taken as the best mode for carrying out the invention, at least as it is presently known. It is anticipated that certain changes or modifications may be made to the seating structure described above during the course of further development work. It is intended, therefore, that the scope of patent protection not necessarily be limited by the preceding description, but instead be limited by the following patent claim or claims. Such claims are to be interpreted in accordance with the well-established doctrines of claim interpretation, in accordance with the statutory laws as they have been interpreted by the courts of the United States.

What is claimed is:

1. An improved, convertible aircraft seating arrangement, for converting two side-by-side aircraft seats from a narrower to a wider seating space configuration, and vice versa, comprising:

a main frame mountable to a floor of an aircraft cabin, in a manner so as to transversely extend across at least a portion of said cabin;

a first armrest assembly fixedly positioned relative to one end of said main frame;

first and second side-by-side aircraft seat frames, movably mounted to said main frame, said seat frames being movable in unison as a pair along said main frame for adjusting said seat frames spatially relative to said first armrest assembly;

a second armrest assembly positioned adjacent to and movably mounted on an opposite end of said main frame; said second armrest assembly being movable transversely relative to said main frame and relative to an adjacent one of said seat frames, for adjusting said second armrest assembly spatially relative to said seat frames and said first armrest assembly; and a center armrest assembly positioned generally intermediately of said seat frames, said center armrest assembly being movably mounted to said main frame, to move along said main frame in unison with said seat frames.

2. The seating arrangement of claim 1, wherein said main frame is generally positioned in a side region of said aircraft cabin; and wherein said first armrest assembly is connected to an outboard end of said main frame, and said second armrest assembly is telescopically connected to an inboard end of said main frame.

3. The seating arrangement of claim 2, wherein said main frame comprises at least a pair of elongated, transversely-extending tubular members; one of said seat frames includes a seat base member, said seat base member being telescopically connected to an inboard end of each of said tubular members, for extending and retracting transversely relative to said tubular members; and said second armrest assembly is telescopically connected to said seat base member, for extending and retracting transversely relative to said seat base member.

4. The seating arrangement of claim 3, wherein each one of said seat frames has a seat back portion, and wherein said second armrest assembly includes a mounting portion telescopically connected to said seat base member and an armrest portion that is pivotably mounted on said mounting portion to be swingable from a generally horizontal position to a position that is generally aligned with said seat back portions.

5. An improved, convertible aircraft seating arrangement, for converting side-by-side aircraft seats from a three seating space configuration to a two seating space configuration, and vice versa, said seats extending transversely between two aisles in an aircraft passenger cabin, comprising:

a main seating frame;

a central seat frame assembly mounted on said main seating frame and including a cushioned seat base portion, and a cushioned seat back portion having opposite lateral recesses;

a pair of aisle seat frame assemblies slidably mounted on said main seating frame, said aisle seat frame assemblies being positioned adjacent opposite lateral sides of said central seat frame assembly, each one of said aisle seat frame assemblies having its own cushioned seat base portion and its own cushioned seat back portion, and each of said aisle seat frame assemblies being slidably movable relative to said main seating frame outboardly and inboardly relative to said central seat frame assembly between a first position in which its seat base portion is spaced from the seat base portion of said central seat frame assembly and a second position in which its seat base portion abuts the seat base portion of said central seat frame assembly; and an intermediate armrest pivotably mounted on the seat back portion of each said aisle seat frame assembly; each said armrest being pivotable between a generally horizontal position and a generally upright position, to provide a folding armrest adjacent each side of said central seat frame assembly when each of said aisle seat frame assemblies is in said first position; and said armrests being received into said recesses, when said armrests are in said upright position and said aisle seat frame assemblies are in said second position, to nest within said seat back portion of said central seat frame assembly.

6. The arrangement of claim 5, including an outer armrest assembly telescopically mounted to an aisle side of each aisle seat frame assembly opposite said central seat frame assembly, for extending and retracting outboardly and inboardly relative to said aisle side.

7. The arrangement of claim 5, wherein said seat back portion of said central seat frame assembly is split into three vertical seat back sections, including two lateral sections and a center section between said lateral sections; said recesses being located in said lateral sections.

8. The arrangement of claim 7, comprising a central armrest pivotably mounted to a forward region of said central seat frame assembly, to be pivotable between a stored position in which it forms a part of said center section and a generally horizontal use position.

9. An improved, convertible aircraft seating arrangement, for converting a row of aircraft seats in an aircraft passenger cabin from six abreast to seven abreast, and vice versa, comprising:

a central set of side-by-side aircraft seats having a first two-seat configuration with a first width, and a second three-seat configuration with a second width greater than said first width;

first and second outboard main frames; and first and second outboard pairs of side-by-side aircraft seats slidably mounted on said first and second outboard main frames, respectively; said pairs being positioned on opposite sides of said central set, each said pair being separated from said central set by an aisle, and said pairs and said central set together defining a row of seats across said passenger cabin;

wherein, in each said pair, said seats of said pair are slidable together as a unit relative to the main frame on which said pair is mounted inboardly and outboardly relative to said passenger cabin; and each said pair includes an armrest which is mounted on one of said seats of said pair to be movable inboardly and outboardly, as a unit with said seats of said pair, relative to the main frame on which said pair is mounted, and is movably mounted on said one of said seats to be movable inboardly and outboardly relative to said seats of said pair.

10. For use onboard a commercial aircraft having a passenger cabin, an improved method of converting a row of seats in said cabin from seven seats abreast to six seats abreast, and vice versa, to convert between economy and business class seating; said row including a central set of seats, and a first pair of outboard seats and a second pair of outboard seats on opposite sides of said central set, respectively; all of said seats having a seat base that includes a base cushion, and a seat back that includes a back cushion and is tiltable relative to said seat base; said central set being separated from each of said pairs of outboard seats by an aisleway; said central set including a centermost seat having opposite lateral sides, and an aisle seat adjacent each said lateral side of said centermost seat; each said aisle seat being laterally shiftable between a first position in which it is spaced at least slightly apart from said centermost seat to give said central set a three-seat configuration, and a second position in which said cushions of said aisle seat abut against said cushions of said centermost seat; said seat back of said centermost seat being vertically split into a central cushioned portion and first and second lateral cushioned portions on opposite sides of said central cushioned portion, respectively; and each said lateral cushioned portion forming, with said seat back of one of said aisle seats, a cushioned seat back area, when said aisle seats are in said second position, to give said central set a two-seat configuration and give said aisle seats a greater width than when said aisle seats are in said first position, said improved method comprising:

making each said pair of outboard seats laterally shiftable, as a single unit, both inboardly and outboardly relative to said cabin;

providing an outboard armrest adjacent an outboard side of each said pair of outboard seats, and fixing each said outboard armrest against lateral movement relative to said cabin;

providing an inboard armrest adjacent an opposite inboard side of each said pair of outboard seats, and making each said inboard armrest laterally shiftable relative to the adjacent pair of outboard seats;

for each said pair of outboard seats, providing an intermediate armrest positioned between the seats of said pair, and making said intermediate armrest laterally shiftable along with said seats of said pair;

providing a pair of intermediate armrests on opposite sides of said centermost seat of said central set of seats, and making each one of said pair of intermediate armrests stowable into one of said cushions of said centermost seat when said aisle seats are shifted from said first position to said second position;

providing a central armrest that is stowable in a forward portion of said back cushion of said centermost seat;

providing said central set of seats with an outer armrest adjacent an outboard side of each said aisle seat, each said outer armrest being laterally shiftable inboardly and outboardly relative to said outboard side of the adjacent aisle seat;

configuring said row of seats from a row of six seats abreast into a row of seven seats abreast by:

(1) laterally shifting each pair of outboard seats, together, as a unit, outboardly relative to said cabin and toward the adjacent outboard armrest, and laterally shifting each inboard armrest outboardly and toward the adjacent pair of outboard seats; and (2) stowing said central armrest in said forward portion of said back cushion of said centermost seat; shifting said aisle seats outboardly into said first position, and unstowing said pair of intermediate armrests to provide armrests on each side of said centermost seat; and laterally shifting each said outer armrest outboardly relative to said outboard side of the adjacent aisle seat; and configuring said row of seats from a row of seven seats abreast into a row of six seats abreast by reversing the steps of paragraphs (1) and (2) above.

11. The improved method of claim 10, comprising, when configuring said row of seats into a row of seven seats abreast:
(1) laterally shifting each pair of outboard seats outboardly relative to said cabin until said outboard side of said pair of outboard seats is substantially flush with an outboard side of the adjacent outboard armrest;
(2) laterally shifting each said inboard armrest outboardly relative to the adjacent pair of outboard seats until said inboard side of the adjacent pair of outboard seats is substantially flush with an inboard side of said inboard armrest; and
(3) laterally shifting said outer armrests outboardly relative to said aisle seats until each of said outer armrest projects into an adjacent aisleway.

12. The improved method of claim 10, comprising, when configuring said row of seats into a row of six seats abreast:
(1) laterally shifting each pair of outboard seats inboardly relative to said cabin until the adjacent outboard armrest is positioned substantially outboardly of said outboard side of said pair of outboard seats;
(2) laterally shifting each said inboard armrest inboardly relative to said cabin and the adjacent pair of outboard seats until said inboard armrest is positioned substantially inboardly of said inboard side of the adjacent pair of outboard seats; and
(3) laterally shifting said outer armrests inboardly relative to said aisle seats until an outboard side of each said outer armrest is substantially flush with an outboard side of an adjacent aisle seat.

* * * * *